No. 611,414. Patented Sept. 27, 1898.
E. R. MEEKER.
TOOL FOR REPAIRING PNEUMATIC TIRES.
(Application filed Feb. 24, 1897.)
(No Model.)
Fig. 1.
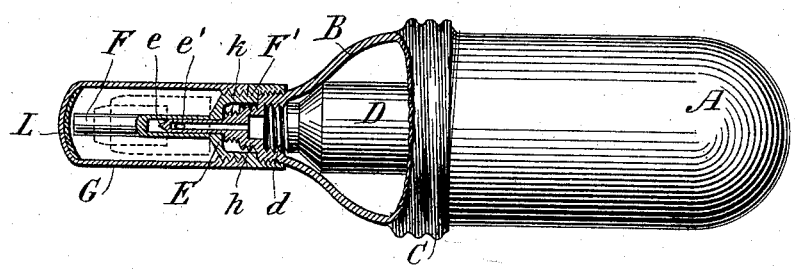
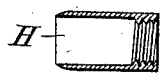
Fig. 2.
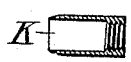
Fig. 3.
Fig. 4.
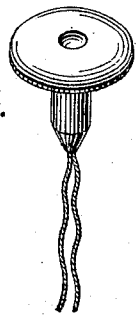
WITNESSES:
C. E. Ashley
H. W. Lloyd.
INVENTOR:
Ellis R. Meeker
By his Attorneys
Baldwin, Davidson & Wight
THE NORRIS PETERS CO., PHOTO-LITHO., WASHINGTON, D. C.

UNITED STATES PATENT OFFICE.

ELLIS R. MEEKER, OF ELIZABETH, NEW JERSEY, ASSIGNOR TO THE NEW YORK BELTING AND PACKING COMPANY, OF NEW YORK, N. Y.

TOOL FOR REPAIRING PNEUMATIC TIRES.

SPECIFICATION forming part of Letters Patent No. 611,414, dated September 27, 1898.

Application filed February 24, 1897. Serial No. 624,826. (No model.)

*To all whom it may concern:*

Be it known that I, ELLIS R. MEEKER, a citizen of the United States, residing at Elizabeth, in the county of Union and State of New Jersey, have invented certain new and useful Improvements in Tools for Repairing Pneumatic Tires, of which the following is a specification.

My invention comprises a pneumatic-tire repair-tool of convenient shape and small size adapted to be carried in the pocket or in the tool-bag of a rider and having means for sealing a small puncture by the injection of cement and of repairing larger punctures by cutting a circular aperture in the tire and inserting and cementing a plug or patch to permanently and securely repair the tire.

To this end my invention consists of a new and improved organization hereinafter set forth and claimed.

In the accompanying drawings, showing my invention in a practical and efficient form and in the form preferred by me and in the best form now known to me, Figure 1 is a view partly in section and partly in side elevation. Figs. 2 and 3 are respectively detached views of cutters, and Fig. 4 is a detached view of a mushroom patch or plug adapted to close the aperture formed in the tire by one of the cutters.

The handle of the instrument is preferably made of sheet metal and is preferably hollow and comprises the shell A and a nose or tapering piece B, the two parts being united by a screw-thread, as indicated at C. Within the hollow handle a suitable assortment or supply of patches or plugs, such as shown in Fig. 4, may be contained, as also may be a flexible tube of cement and, if desired, a small roll of friction-tape, which latter, however, is not shown. The tube of cement D is in Fig. 1 indicated as being within the hollow handle. Its screw-cap is removed, and the screw-threaded neck *d*, from which the cap has been removed, is shown as screwed into a correspondingly threaded end of a nozzle E. This nozzle is shown as formed in one piece with the end B of the casing, and this is the preferred construction, although it is perfectly apparent that the nozzle might be screwed into the end of the part B or otherwise be detachably connected therewith. The nozzle is of course hollow, is made of sufficiently small diameter, and has a pointed end *e* and an aperture or outlet *e'* for the cement, which is preferably located in the side of the nozzle adjacent to its pointed end. It is obvious that if the other parts not yet described (shown in Fig. 1) be removed and the part A of the handle be detached from B the part B serves as a handle by means of which the pointed nozzle may be forced into an aperture in a pneumatic tire, and that when properly inserted pressure upon the flexible tube D of cement will expel the cement through the aperture *e*, and that if the nozzle be properly manipulated the cement may be deposited in such a way as to seal the puncture, as is well understood.

For punctures not adapted to be thus repaired the tool comprises other means of repairing them, as follows: The nozzle is covered by a pin F, having a recess in which the nozzle lies, and an enlarged cup-shaped end F', internally threaded and screwing upon a corresponding thread formed on the end of the part B of the handle, and the pin may be covered by a cylindrical cap G, internally screw-threaded at its open end and screwing upon an external thread formed upon the cup-shaped end F' of the pin F. Two cutters of different sizes H K (shown in detail in Figs. 2 and 3) may then be carried within the cylindrical cap G, being placed one within the other and slipped over the pin F, as indicated in Fig. 1, and the cutters may be carried in the hollow handle, if desired. In the event of their being carried within the cylindrical cap G, I should prefer to place them, as shown, with their annular cutting edges turned toward the end of the cap, and in that event I prefer to line the inner end of the cap with a washer L, of leather, felt, or other suitable material, to prevent dulling of the cutting edges by contact with the metallic end of the cylindrical cap. The cutters H K are respectively formed with sharp annular cutting edges at one end and at the other end with an internal screw-thread, as shown. The nozzle or end of the part B of the handle is formed with two shoulders of different diameters and respectively provided with screw-threads $h\ k$ to fit the corresponding threads of the cutters H K. If now it is desired to repair a tire by cutting a circular section therefrom and inserting a plug or patch, the cylindrical cover G and the pin F are removed, the cutter (either H or K) is screwed into position, and a circular section is cut from the tire by the proper manipulation of the tool. The cutter is then removed, the pin F placed in position, and a patch or plug, such as shown in Fig. 4, is inserted. The patch or plug shown is what is known as a "mushroom" patch and is of a common style well known. It is formed with a disk or head from which extends a stem or plug, which is preferably pointed at the end and has secured in it and extending therefrom one or more cords. The outer face of the head of the plug is formed with a central recess or depression. The plug having been properly coated with cement its pointed stem is inserted in the circular aperture that has been cut in the tire, the ends of the cords being, however, held by the operator. The end of the pin F is placed against the center of the head of the plug or patch, and the patch is pushed entirely through the aperture in the tire. The strain upon the cord upon which the operator has retained a hold reverses the plug within the tire, so that its stem may be drawn through the aperture, completely closing it, while the head is drawn against the inner face of the tire surrounding the aperture. This manner of repairing with a mushroom plug or patch is well known.

The tool which I have described and which is illustrated in the drawings possesses in a compact and convenient form all the requisites for the speedy and easy repair of punctures of pneumatic tires and is designed to be carried by the rider. It will be made of such size as will be found most convenient and best adapted to the needs of bicycle-riders, having when assembled the pointed or tapering end, which may be most convenient, inserted first into the tool-bag of the rider.

I claim as my invention—

1. A pneumatic-tire repair-tool, comprising a two-part separable hollow handle adapted for use as a receptacle, a nozzle attached to and extending from one end of the handle and having an exterior screw-thread around its base and adapted at its larger end to receive the open end of a cement-tube, and a recessed patch-inserting pin having a corresponding screw-thread fitting over the nozzle, screwing upon the thread thereon and serving as a cover for the nozzle, substantially as and for the purpose set forth.

2. A pneumatic-tire repair-tool, comprising a two-part separable hollow handle, serving as a receptacle, a nozzle attached to and extending from one end of the handle and adapted at its larger end to receive the open end of a cement-tube and having around its base two screw-threads of different diameter, one adapted to receive a correspondingly-threaded annular cutter, and a recessed patch-inserting pin screwing upon the other thread, fitting over the nozzle and serving as a cover therefor, substantially as and for the purpose set forth.

3. A pneumatic-tire repair-tool, comprising a two-part separable hollow handle, serving as a receptacle, a nozzle attached to and extending from one end of the handle and adapted at its larger end to receive the open end of a cement-tube and having around its base two screw-threads of different diameter, one adapted to receive a correspondingly-threaded annular cutter, a recessed patch-inserting pin screwing upon the other thread, fitting over the nozzle and serving as a cover therefor, and a detachable cylindrical cap covering the opening and screwing upon the first-named screw-thread around the base of the nozzle, whereby a chamber is formed for holding the annular cutter, which may be placed over the patch-inserting pin and within the cylindrical cap, substantially as and for the purpose set forth.

4. A pneumatic-tire repair-tool comprising a two-part separable handle formed of sheet metal and adapted to serve as a receptacle, a nozzle formed in one piece with one of the sections of the handle, and the interior opening of the handle communicating with the nozzle being screw-threaded to receive the threaded neck of a cement-tube, one or more screw-threads on the exterior of the nozzle end of the handle adapted to receive correspondingly-threaded cylindrical cutters, another screw-thread adapted to receive the correspondingly-threaded cap of a recessed patch-inserting pin that covers the nozzle, and a cylindrical cap adapted to be secured in place to cover the patch-inserting pin.

In testimony whereof I have hereunto subscribed my name.

ELLIS R. MEEKER.

Witnesses:
FRANK S. OBER,
EDWARD C. DAVIDSON.